United States Patent [19]

Herbert, Jr. et al.

[11] Patent Number: 5,177,854
[45] Date of Patent: Jan. 12, 1993

[54] DISTORTION-FREE METHOD OF MOUNTING AN END PIECE ON A THIN-WALLED HOLLOW TUBE

[76] Inventors: William G. Herbert, Jr., 3314 Eaton Rd., Williamson, N.Y. 14589; Stuart B. Berger, 82 Brittany Cir., Rochester, N.Y. 14618; Alexander A. Antonelli, 200 Hillview Dr., Rochester, N.Y. 14622; Fredrick A. Warner, 400 Harvest Rd., Fairport, N.Y. 14450; Paul J. Kaveny, 220 Seneca Rd.; Anthony A. Attardi, 2804 Titus Ave., both of Rochester, N.Y. 14622; Joseph Mammino, 59 Bella Dr., Penfield, N.Y. 14526; Ernest F. Matyl, 980 Emily La., Webster, N.Y. 14580

[21] Appl. No.: 770,374

[22] Filed: Oct. 3, 1991

[51] Int. Cl.⁵ .............................................. B23Q 17/00
[52] U.S. Cl. .................................. 29/407; 29/895.212; 29/895.22; 29/469.5; 29/507; 29/522.1
[58] Field of Search ............... 29/407, 895.21, 895.212, 29/895.22, 469.5, 507, 522.1, 523

[56] References Cited

U.S. PATENT DOCUMENTS

| 3,141,305 | 7/1964 | Schenk ...................... 29/522.1 X |
| 3,545,072 | 12/1970 | Lindesmith et al. ........... 29/522.1 X |
| 3,585,710 | 6/1971 | Wilder et al. ................. 29/507 X |
| 3,982,778 | 9/1976 | Spencer et al. ................ 29/523 X |
| 4,015,765 | 4/1977 | Ahmed ...................... 29/522.1 X |
| 4,137,028 | 1/1979 | Reitemeyer et al. . |
| 4,189,821 | 2/1980 | Potter ........................ 29/523 X |
| 4,279,857 | 7/1981 | Feuerherm . |
| 4,461,663 | 7/1984 | Tachibana et al. ........... 29/895.21 X |
| 4,640,641 | 2/1987 | Edelmayer .................. 29/522.1 X |
| 4,961,261 | 10/1990 | Kojima et al. .................. 29/895.21 |

FOREIGN PATENT DOCUMENTS 1960033 6/1971 Fed. Rep. of Germany ... 29/895.22

Primary Examiner—Timothy V. Eley
Attorney, Agent, or Firm—Finnegan, Henderson, Farabow, Garrett & Dunner

[57] ABSTRACT

Distortion-free method of mounting an end piece member on a thin-walled hollow tube member, particularly in the assembly of photoreceptor drums and the like, includes the steps of supporting an expandable end piece member within the chamber of an air centering device with its central axis aligned vertically; applying a layer of flowable adhesive to the interior surface of an open end of the hollow tube member; freely suspending the tube member above the end piece member with the open end remaining free of radial distortion and directed toward the end piece member; centering the tube member, by means of the air centering device, to concentrically align the tube member with the end piece member; inserting the end piece member into the tube member; deformingly expanding the end piece member until the layer of flowable adhesive is sufficiently compressed between an outer peripheral edge of the end piece member and the interior surface of the tube member, so as to absorb any dimensional discrepancies therebetween; ceasing the expansion of the end piece member once the radial distortion of the tube member reaches a predetermined distortion value; and curing the flowable adhesive to affix and maintain the end piece member concentrically within the tube member.

20 Claims, 5 Drawing Sheets

DISTORTION-FREE METHOD OF MOUNTING AN END PIECE ON A THIN-WALLED HOLLOW TUBE

BACKGROUND OF THE INVENTION

1. Field of the Invention

The present invention relates to methods for mounting an end piece member on an open end of a thin-walled hollow tube member without inducing radial distortion of the hollow tube member, particularly in the assembly of photoreceptor drums or the like.

2. Description of the Prior Art

Reprographic devices, such as photocopiers, duplicators, and laser printers, commonly utilize electrostatic principles to reproduce printed materials. In operation, the image to be printed is generated onto a substrate, such as a rotatable photoreceptor drum, by an electrographic process. Toner or developer material is then applied to the substrate to create the image in visible form, which then is transferred and fixed to paper or similar base material.

Recent advancements in reprographic techniques have resulted in greatly enhanced imaging definition. However, these results are dependent upon the high dimensional accuracy and interaction of the various components which make up the reprographic device. In particular, even minute variations in the rotational alignment or surface evenness of the photoreceptor drum can prove detrimental to the image generation process, making efforts toward improving image resolution futile. As such, the dimensional accuracy of the photoreceptor drum is critical to the achievement of the desired imaging definition. The primary indicator of dimensional accuracy of the photoreceptor drum is referred to as Total Indicator Run-out (TIR), which is a measure of the trueness of the drum surface and the centricity of the rotational axis.

To date, a photoreceptor drum or the like, is typically assembled by frictionally fitting and securing at least one end piece member into an open end of a hollow tube member. The hollow tube member is typically made of, but not limited to, aluminum, or any other conductive material, which is then specially treated with successive layers of extremely sensitive semi- and photo-conductive solutions. The end piece member includes a central aperture to receive a central axial shaft for rotatably supporting the hollow tube member. As such, the hollow tube member must be precision manufactured to include a mounting area to snugly receive the end piece member concentrically therein, while inducing minimal radial distortion to the outer peripheral surface of the hollow tube member.

The precision manufacture of the hollow tube member and end piece member includes cutting the tube member to the proper length; machining a mounting area into the open end of the tube; truing the exterior surface of the tube member; and machining the end piece member to be concentrically received by the corresponding mounting area. However, since the hollow tube member must be constrained during a majority of the manufacturing process, distortion of the manufactured tube member inherently occurs when the constraints are removed and the tube member returns to its unstressed, relaxed condition.

Further distortion of the exterior surface of the hollow tube member occurs upon insertion of the end piece member into the mounting area, due to the snug frictional engagement and tolerance stack-up between the end piece member and the mounting area of the hollow tube member, as seen in FIG. 1. Of course, concerns over dimensional inaccuracies are not limited to the distortion of the substrate surface. Tolerance stack-up between the end piece member and the hollow tube member inherently results in eccentric alignment of the end piece member, as well.

An additional consideration in the manufacture of photoreceptor drums is cost of production. The precision machining processes typically required for the hollow tube member and end piece member add extraordinary expenses to the overall assembly cost of the photoreceptor drum. Likewise, while a thin-walled hollow tube member is preferred for economic reasons, the current method of assembling a photoreceptor drum prohibits its use since the thin-walled member cannot be adequately machined to include an end piece member mounting area.

SUMMARY OF THE INVENTION

The general object of the invention is to provide a method of mounting an end piece member on an open end of a thin-walled hollow tube member to form an assembled drum without inducing radial distortion of the tube member.

Another object of the invention is to provide a method of mounting an end piece member on an open end of a thin-walled hollow tube member to form an assembled drum, which is capable of concentrically aligning the two members for precision rotation of the assembled drum, as measured by TIR.

An additional object of the invention is to provide a method of mounting an end piece member on an open end of a thin-walled hollow tube member, which requires no extraneous machining or tooling of the individual members to ensure close tolerance fits.

Another object of the invention is to provide a method of mounting an end piece member on an open end of a hollow tube member to form an assembled drum, which can utilize an inexpensive thin-walled hollow tube member without requiring special adaptation its ends.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method of mounting an end piece member on an open end of a thin-walled hollow tube member without inducing radial distortion of the hollow tube member, wherein one of the members is smaller than and freely insertable within the other, and each of the members has a central axis.

The method comprises the steps of supporting the end piece member with the central axis of the end piece member aligned vertically; freely suspending the hollow tube member above the end piece member with the central axis of the hollow tube member aligned vertically, and with the open end remaining free of radial distortion and directed toward the end piece member; centering the hollow tube member to concentrically align the hollow tube member with the end piece member; inserting the smaller member into the larger member, whereby the smaller member has an outer peripheral edge spaced from and surrounded by an interior surface of the larger member so as to form an annular gap therebetween; and securing the outer peripheral edge of the smaller member to the interior surface of the larger member while maintaining the concentric alignment between the two members.

In the preferred embodiment of the invention, the securing step includes the steps of applying a layer of flowable adhesive between the outer peripheral edge of the smaller member and the interior surface of the larger member; and curing the flowable adhesive to affix the smaller member concentrically within the larger member.

Likewise, the preferred embodiment of the invention further includes selecting the end piece member to be smaller than and freely insertable within the hollow tube member, wherein the end piece member is deformingly expandable. The securing step of the invention involves deformingly expanding the end piece member until the layer of flowable adhesive is sufficiently compressed to absorb any dimensional discrepancies between an outer peripheral edge of the end piece member and an interior surface of the hollow tube member. Expansion of the end piece member is continued until a predetermined radial distortion value of the hollow tube member is reached, at which point the expansion is automatically ceased.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 5 shows the step of supporting the expandable end piece member with its central axis aligned vertically;

FIG. 6 shows the step of freely suspending the hollow tube member over the expandable end piece;

FIG. 7 shows the step of centering the hollow tube member to concentrically align the hollow tube member with the expandable end piece member;

FIG. 8 shows the step of inserting the expandable end piece member into the hollow tube member with flowable adhesive located therebetween;

FIG. 9 shows the step of deformingly expanding the expandable end piece member until a predetermined distortion value is reached; and FIG. 10 the expandable end piece member securely fixed on the open end of the hollow tube member.

DESCRIPTION OF THE PREFERRED EMBODIMENT

Figure 1:
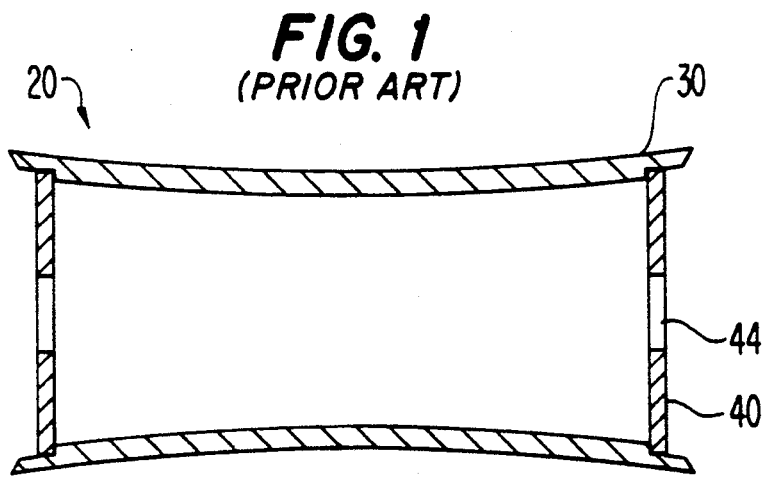
FIG. 1 is a cross sectional view of a representative embodiment of a photoreceptor drum assembled by the prior art, which shows the hollow tube member being distorted by the conventional mounting of the end piece members.

Reference will now be made in detail to the present preferred embodiment of the invention, an example of which is illustrated in the accompanying drawings. Wherever possible, the same reference numbers will be used throughout the drawings to refer to the same or like parts.

In accordance with the invention, the method of mounting an end piece member 40 on an open end 34 of a thin-walled hollow tube member 30 particularly relates to the assembly of photoreceptor drums 20 or the like. This is due primarily to the high degree of accuracy required in the assembly of photoreceptor drums 20 which are used in reprographic devices with enhanced resolution capabilities.

A photoreceptor drum 20 assembled by the method of the present invention comprises a thin-walled hollow tube member 30 and at least one end piece member 40 which is mounted on an open end 34 of the hollow tube member 30. Each member has a central axis, such that once assembled by the method of the present invention, the central axis 42 of the end piece member 40 is aligned with the central axis 32 of the hollow tube member 30. The end piece member 40 additionally has an aperture 44 passing through its axial center. Once mounted, the end piece member 40 provides a means for rotatably supporting the hollow tube member 30 upon a central axial shaft. In the preferred embodiment of the invention, the thin-walled hollow tube member 30 is circular in cross-section, and the end piece member 40 is configured to match the cross-section accordingly.

Typically a photoreceptor drum 20 includes two end piece members 40, one mounted at either end of the hollow tube member 30. After mounting one end piece member 40 on an end of the hollow tube member 30, the distortion-free method of the invention is simply repeated on the opposite end of the hollow tube member 30. However, for illustrative purposes, the preferred embodiment of the invention discussed herein need only address the method of mounting an end piece member 40 on one end of the hollow tube member 30.

Of course, there may be some circumstances in which only one end piece member is required to be mounted on a hollow tube member. Such would be the case if a thin-walled hollow tube member were formed by forced drawn method with only one open end and an opposite integral closed end. Likewise, it is again noted that the method of the invention is not limited to the assembly of photoreceptor drums 20, but rather, may be used in the assembly of any object comprised of a thin-walled hollow tube member 30 and at least one end piece member 40.

In accordance with the invention, the method of mounting an end piece member 40 on an open end 34 of a thin-walled hollow tube member 30 includes a series of steps to ensure concentric alignment of the two members. The method of the present invention further enables securement of the two members without inducing radial distortion of the outer peripheral surface of the hollow tube member 30.

Figure 2:
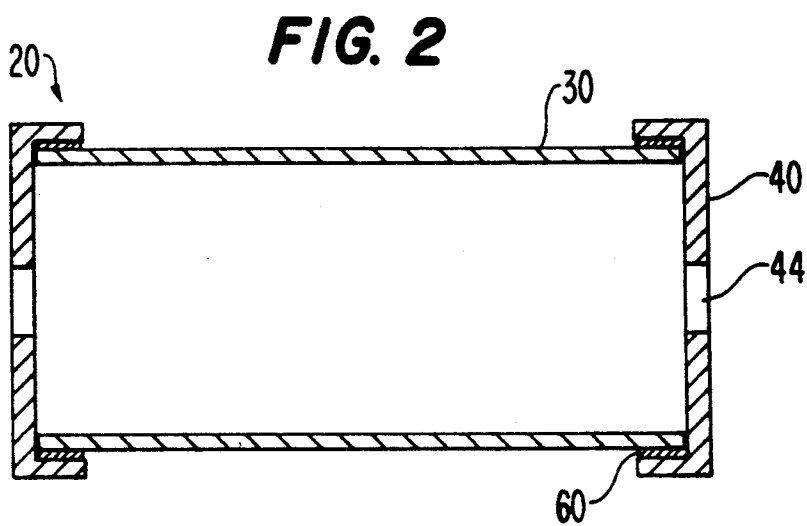
FIG. 2 is a cross sectional view of a representative embodiment of a photoreceptor drum assembled by the method of the present invention, which shows the hollow tube member being smaller than and freely insertable within the end piece member.
Figure 3:
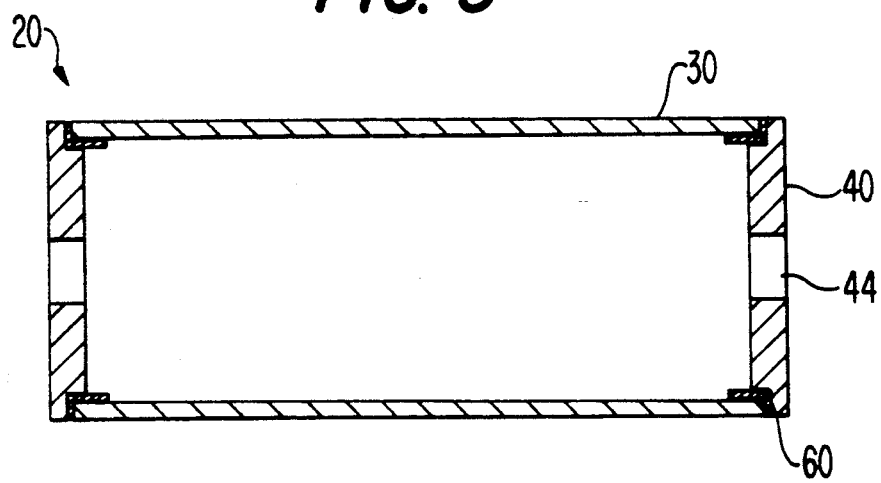
FIG. 3 is a cross sectional view of a different representative embodiment of a photoreceptor drum assembled by the method of the present invention, which shows the end piece member being smaller than and freely insertable within the hollow tube member.
Figure 4:
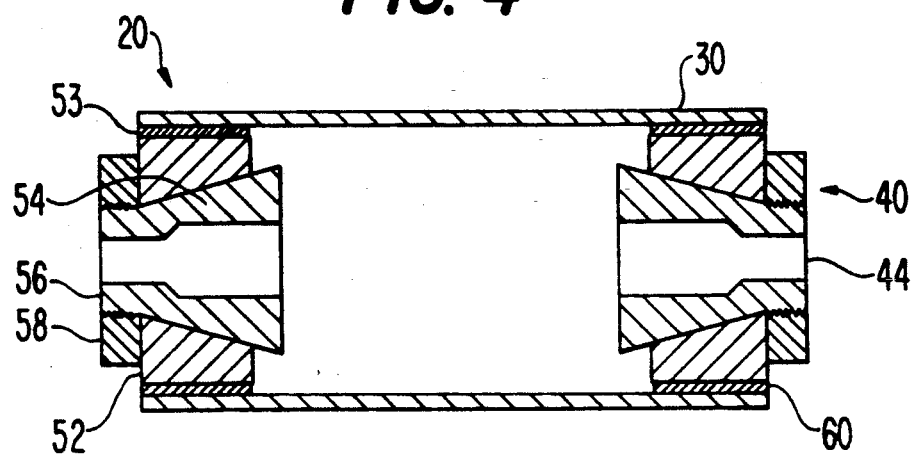
FIG. 4 is a cross sectional view of another representative embodiment of a photoreceptor drum assembled by the method of the present invention, which shows an expandable end piece member being smaller than and freely insertable within the hollow tube member.

Further in accordance with the invention, one of the two members of the drum 20 is smaller than and freely insertable within the other. FIG. 2 shows one embodiment of a photoreceptor drum 20 assembled by the method of the invention, wherein the hollow tube member 30 is smaller than and freely insertable within the end piece member 40. Alternatively, FIG. 3 discloses a photoreceptor drum 20 embodiment with the end piece member 40 smaller than and freely insertable within the hollow tube member 30. In the preferred embodiment of the drum 20 to be assembled by method of the invention, not only is the end piece member 40 smaller than and freely insertable within the hollow tube member 30, but the end piece member 40 is also deformingly expandable, as seen in FIG. 4.

The distortion-free method steps include supporting the end piece member 40 with central axis 42 of the end piece member 40 aligned vertically; freely suspending the hollow tube member 30 above the end piece member 40 with the central axis 32 of the hollow tube member 30 aligned vertically, and with an open end 34 of the hollow tube member 30 remaining free of radial distortion and directed toward the end piece member 40; centering the hollow tube member 30 to concentrically align the hollow tube member 30 with the end piece member 40; inserting the smaller member into the larger member, whereby the smaller member has an outer peripheral edge 48 spaced from and surrounded by an interior surface 38 of the larger member so as to form an annular gap 62 therebetween; and securing the outer peripheral edge 48 of the smaller member to the interior surface 38 of the larger member while maintaining the concentric alignment of the two members.

In accordance with the invention, the method step of supporting the end piece member with its central axis aligned vertically establishes a precision alignment between the end piece member and the hollow tube member. This may only be accomplished if the end piece member is securely supported in an accurately aligned, known location prior to mounting.

As embodied herein, vertically aligning the central axis 42 of the end piece member 40 is an easy step to perform, yet fundamental to the distortion-free mounting method. Generally, the end piece member 40 to be mounted has a flat outer face 46 with the central axis 42 extending perpendicularly therethrough. As illustratively demonstrated in FIG. 5 by way of example and not limitation, vertical alignment of the central axis 42 is preferably accomplished by centrally positioning the end piece member 40 on a horizontal support surface 75 with the flat outer face 46 of the end piece member 40 lying flush with the horizontal support surface 75. As such, the central axis 42 of the end piece member 40 will inherently extend normal to the horizontal support surface 75 from a known location, so as to be aligned vertically.

In the preferred embodiment, the procedure of vertically aligning the end piece member 40 on a horizontal support surface 75 is not only easy to perform, but efficient and inexpensive as well. No costly equipment or machinery is required to perform time-consuming adjustments on the alignment of the end piece member 40. An end piece member 40 with a flat outer face 46 perpendicular to the central axis 42, and a horizontal support surface 75 is sufficient. Of course, alternative means of supporting the end piece member 40 may be used; however, it is unlikely that the advantages of using such means would be comparable to the benefits of a simple horizontal support surface 75.

Just as vertical alignment simplifies the step of supporting the end piece member 40, so does vertical alignment simplify the step of suspending the hollow tube member 30. As previously mentioned, it is desirable for a photoreceptor drum 20 to be made of a thin-walled hollow tube member 30 to reduce material costs. As a result of the thin wall configuration, however, a hollow tube member 30 is easily deformed by the application of radially-directed forces, or even by virtue of its own weight when in a horizontally aligned position. Therefore, it is essential that special care be taken in handling and aligning the thin-walled hollow tube member 30.

Figure 6:
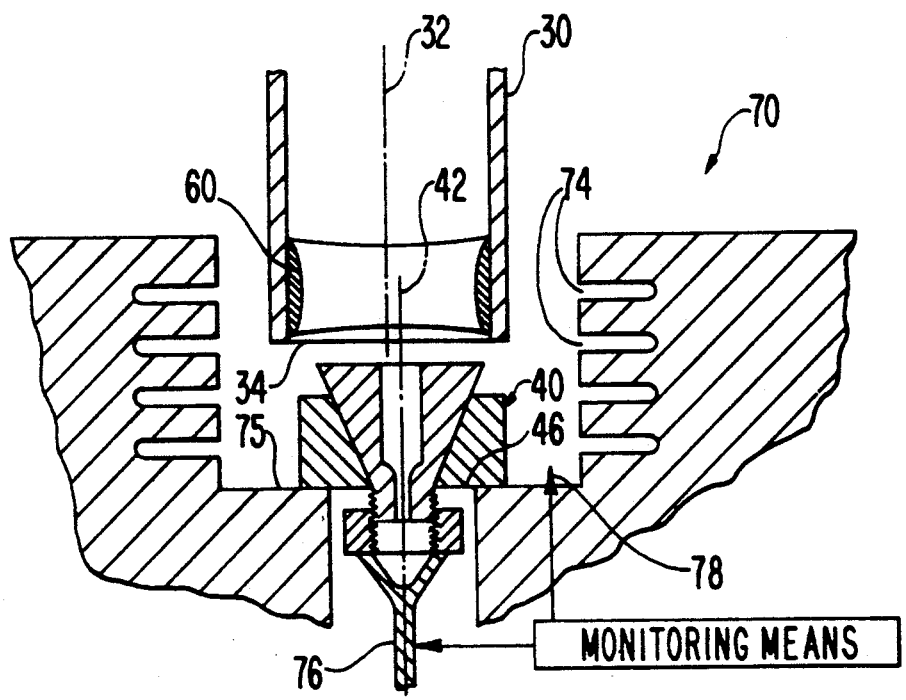

In accordance with the invention, the distortion-free mounting method includes the step of freely suspending the hollow tube member above the end piece member with the central axis of the hollow tube member aligned vertically. As embodied herein, and as shown in FIG. 6 by way of example and not limitation, the hollow tube member 30 is suspended with the open end 34 remaining free of radial distortion and directed toward the end piece member 40.

The preferred embodiment of the freely-suspending step involves suspending the hollow tube member 30 by a point distant from the open end 34. With the center of gravity of the tube member 30 located between the point by which the tube member 30 is suspended and the open end 34 of the tube member 30, vertical alignment of the tube member 30 with the open end 34 directed downward occurs naturally. Likewise, with sufficient distance provided between the point of suspension and the open end 34 of the tube member 30, the open end 34 remains free of radial distortion. That is, no radially-directed gripping forces are necessary near the open end 34 to support the hollow tube member 30. Further, the step of freely suspending the hollow tube member 30 permits the hollow tube member 30 to be easily manipulated into a concentric mounting alignment relative the end piece member 40.

A variety of different means may be utilized for freely suspending the hollow tube member 30; but it is preferred that the hollow tube member 30 be suspended by a point at its extreme distal end opposite the open end 34, for the reasons discussed above. This may be accomplished by using a temporary engaging means (not shown), such as an expandable collet, which may be inserted into the distal end to uniformly engage the interior surface 38 of the hollow tube member 30. Alternatively, a set of spaced-apart clip members may be arranged to grip the thin wall of the hollow tube member 30 symmetrically about the periphery of the distal end.

In any event, it is preferred that the temporary means used to engage the hollow tube member 30 be attached to an elongate flexible member (not shown), such as a fine cable or cord. Preferably, the flexible member is substantially centered with the central axis 42 of the end piece member 40 supported below. In this manner, minimal adjustment forces need be applied for centering the hollow tube member 30 over the end piece member 40. Of course, there remain other alternatives within the scope of the invention which may be used for freely suspending the hollow tube member 30.

In accordance with the present invention, centering of the hollow tube member to concentrically align the hollow tube member with the end piece member ensures TIR accuracy, thus enhancing imaging resolution of the assembled photoreceptor drum. However, it is during the centering process that radial distortion often occurs in conventional mounting methods.

Conventional methods, if used, would involve pushing the hollow tube member 30 into concentric alignment with the end piece member 40 by the direct application of radial positioning forces to the exterior surface 36 of the tube member 30. Because these positioning forces are asymmetrical applied, i.e. applied only to one side of the hollow tube member 30, the thin wall of the tube member 30 would tend to bow inward, causing distortion to the cross section of the hollow tube member 30.

Figure 7:
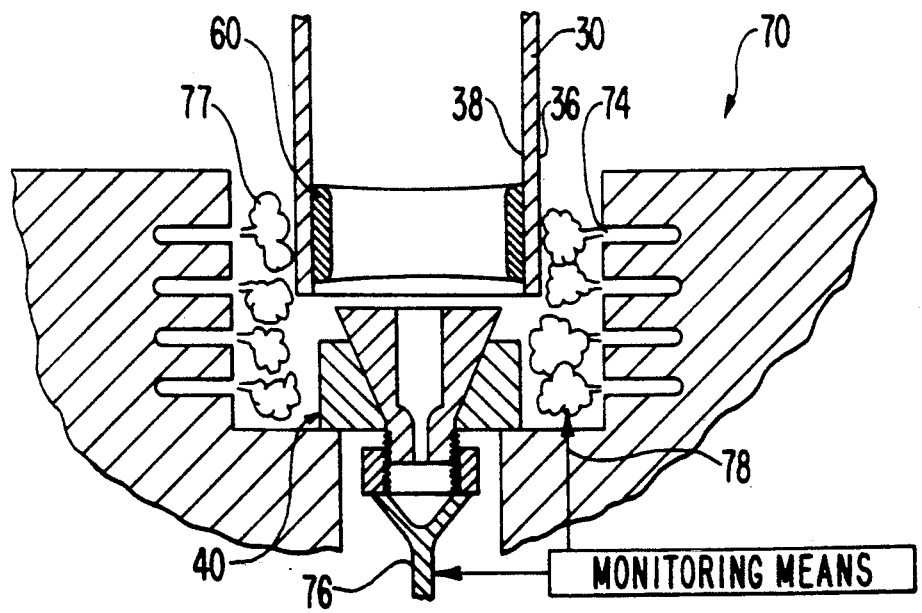

As embodied herein, and demonstrated in FIGS. 6 and 7, distortion-free centering of the hollow tube member 30 is accomplished by means of an air centering device 70. The air centering device 70 comprises a chamber 72 defined by an inner peripheral wall 73, and a plurality of inwardly-directed radial air jets 74 evenly spaced along the inner peripheral wall 73. Activation of the air jets 74 generates a uniform rebound pressure buildup 77 across the exposed outer surface of the hollow tube member 30, so as to gently urge the tube member 30 into concentric alignment with the chamber 72, without inducing radial distortion.

Preferably, the cross section of the chamber 72 is similar to that of the hollow tube; that is, there is a constant distance between the outer surface of the concentrically-aligned tube member 30 and the inner peripheral wall 73 of the chamber 72. Once urged to the center of the chamber 72, the rebound air pressure buildup 77 between the hollow tube member 30 and the inner peripheral wall 73 remains uniform so as to hold the tube member 30 in a stable, concentrically-aligned condition within the chamber 72.

Figure 5:
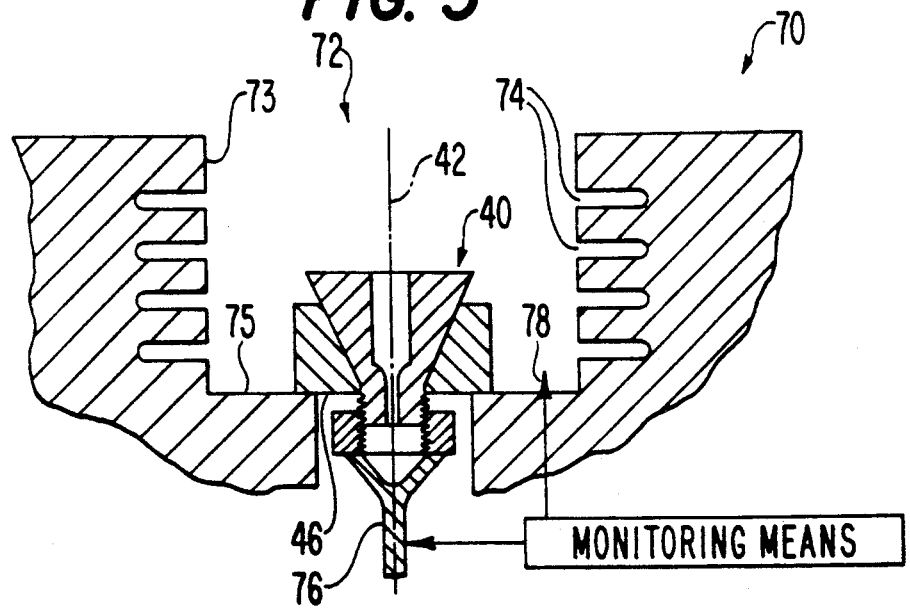
FIGS. 5 through 10 are representative cross sectional views systematically showing the procedural steps of mounting an expandable end piece member on an open end of a thin-walled hollow tube member; and in particular.

To concentrically align the hollow tube member 30 with the end piece member 40, the end piece member 40 simply need be preloaded into the chamber 72. In the preferred embodiment, the bottom of the chamber 72 has the horizontal support surface 75 for supporting the end piece member 40 with its central axis 42 aligned vertically, as shown in FIG. 5 and discussed in detail above. Also included in the chamber 72 is a means 76 for concentrically positioning the end piece member 40 within the chamber 72. By centering the hollow tube member 30 within the chamber 72, the tube member 30 is concentrically aligned with the end piece member 40 as well.

To concentrically align the end piece member 40 within the chamber 72, the horizontal support surface 75 may simply be provided with protuberances or indentations to position the end piece member 40 in proper alignment. As embodied herein, however, the chamber 72 is provided with a mechanical positioning means 76, as shown in FIGS. 5 through 9, for both concentrically aligning and activating a deformingly expandable end piece member 40. Of course, the type of positioning means 76 used for concentrically aligning the hollow tube member 30 and end piece member 40 is ultimately dependent upon the configuration of the members used.

Also dependent upon the configuration of the members used, and in accordance with the invention, is the subsequent step of inserting one of the members into the other. As mentioned above, one of the two members of the drum is smaller than and freely insertable within the other. Obviously, if the hollow tube member is smaller than the end piece member, as illustrated in FIG. 2, the inserting step involves inserting the hollow tube member into the end piece member. Such would be the case if it were desirable for the end piece member to cuff the hollow tube member. Conversely, if the end piece member is smaller than the hollow tube member, as seen in FIG. 3 and the preferred embodiment of FIG. 4, the step involves inserting the end piece member into the tube member.

Of course, the step of inserting the smaller member into the larger member does not necessarily require that the smaller member be physically moved to accomplish the insertion. In the preferred embodiment, the end piece member 40 is smaller than and freely insertable within the hollow tube member 30. As clearly demonstrated in FIGS. 7 and 8, by way of example and not limitation, the smaller end piece member 40 may be inserted into the larger hollow tube member 30 by physically lowering hollow tube member 30 onto the end piece member 40. In other words, the step of inserting the smaller member into the larger member is not a limitation to movement of the smaller member alone.

Regardless of which member is smaller, however, it should be understood that the two members are assembled such that the smaller member has an outer peripheral edge 48 spaced from and surrounded by an interior surface 38 of the larger member so as to form an annular gap 62 therebetween. As will be discussed hereinafter, this condition is advantageous in the step of securing the two members together.

In accordance with the invention, the proper means for securing the end piece member to the hollow tube member is often determinative of distortion-free mounting. Although various securing means may be utilized, the preferred means for distortion-free mounting is a flowable adhesive 60. As embodied herein, the adhesive 60 is applied between the outer peripheral edge 48 of the smaller member and the interior surface 38 of the larger member. Due to its viscosity, the adhesive 60 fills the annular gap 62 between the two members, and compensates for any tolerance indifference or dimensional discrepancies. The adhesive 60 is then cured to securely affix the members together, while maintaining the concentric alignment of the hollow tube member 30 with the end piece member 40.

It is important to note, however, that curing characteristics vary greatly from one type of adhesive to another. For example, certain adhesives shrink as they cure, while others expand. Similarly, some adhesives are more endothermic or exothermic in nature than others. As such, great care must be taken in selecting the proper adhesive to be used, so as to minimize the risk of radial distortion of the hollow tube member 30 during the curing process. As embodied herein, an adhesive 60 which shrinks during curing and has minimal endothermic characteristics is preferred over expanding or exothermic adhesives. An example of such an adhesive is thixotropic cyanoacrylate (i.e. Speed Bonder 324 and Super Bonder 409 available from Loctite Corporation). Of course, the particular adhesive selected is dependent upon the conditions of the intended use of the assembled drum 20. Consequently, water soluble adhesives, for example, should not be selected for drums 20 used in wet environments.

Figure 8:
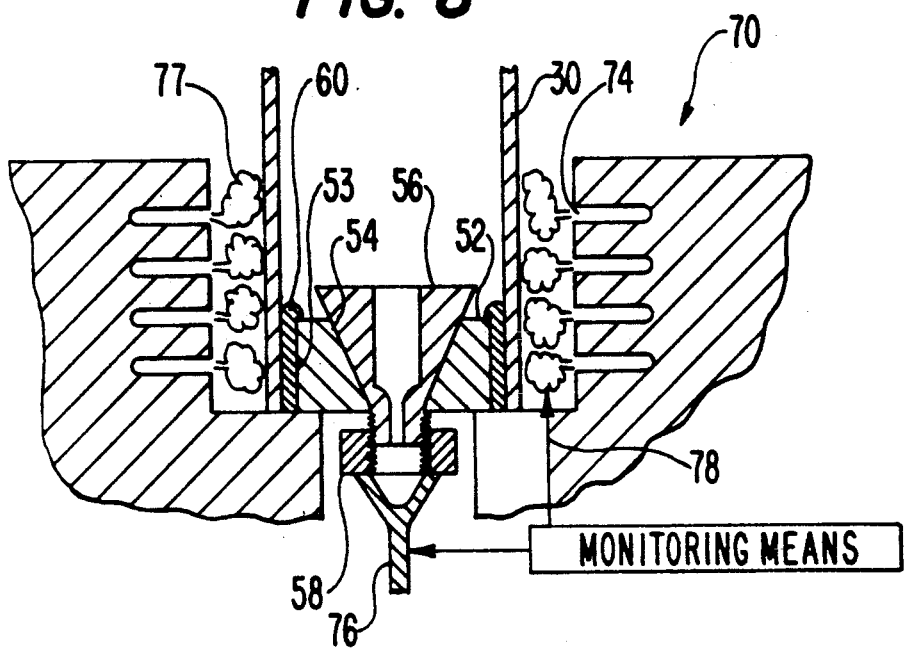

In the preferred embodiment, as illustratively shown in FIGS. 6 through 8, a sufficient layer of flowable adhesive 60 is applied to the interior surface 38 of the hollow tube member 30 prior to positioning the tube member 30 within the air centering device 70. This procedure protects the adhesive 60 from exposure to the air jets 74, as opposed to being applied to the exposed outer peripheral edge 48 of the end piece member 40. Of course, alternate procedures are available for applying the flowable adhesive 60, such as an upwardly-directed glue gun nozzle located in the horizontal support surface 75 for injecting the flowable adhesive 60 between the two members after insertion of the end piece member 40 into the tube member 30.

Figure 9:
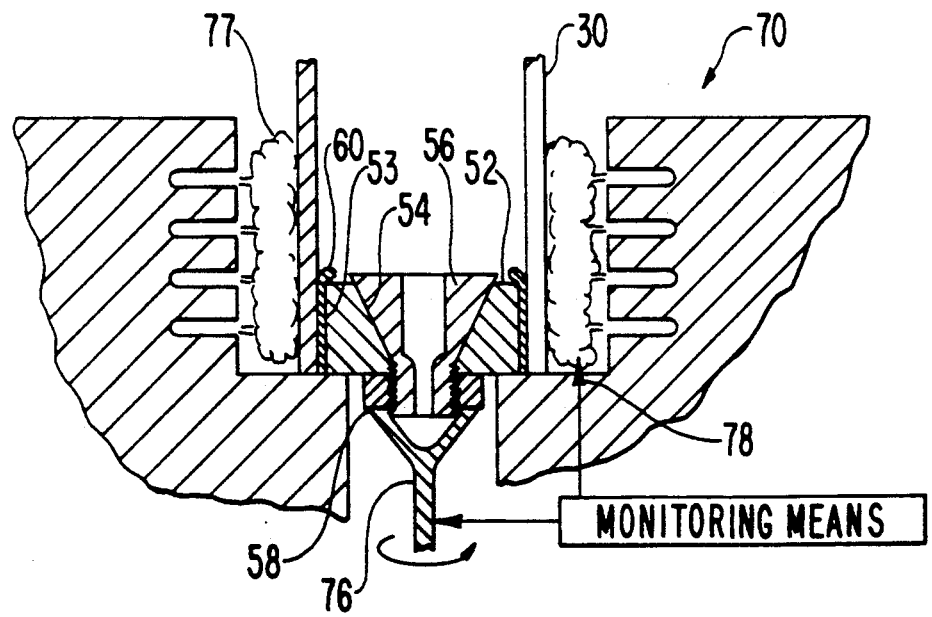
Figure 10:
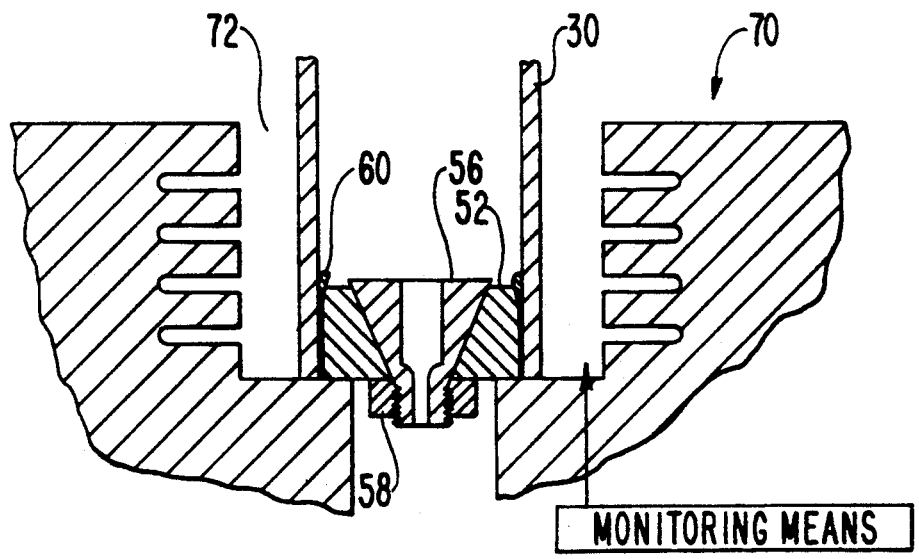

In furtherance of the securing step, and as embodied herein, the end piece member 40 to be mounted on the hollow tube member 30 may be deformingly expandable. FIGS. 8 through 10 illustratively demonstrate the securing step, as performed with a deformingly expandable end piece member 40 in combination with a layer of flowable adhesive 60. Upon insertion of the end piece member 40, the end piece member 40 is deformingly expanded until the layer of flowable adhesive 60 is sufficiently compressed to absorb any dimensional discrepancies between the outer peripheral edge 48 of the end piece member 40 and the interior surface 38 of the hollow tube member 30. Expansion of the end piece member 40 is continued while the radial distortion of the hollow tube member 30 is constantly monitored. When a predetermined radial distortion value of the hollow tube member 30 is reached, expansion of the end piece member 40 is automatically ceased.

Likewise, the securing step could be performed with the deformingly expandable end piece member 40 alone. That is, securing the end piece member 40 to the hollow tube member 30 by frictional engagement can be accomplished without the use of an adhesive 60. This alternative procedure would involve deformingly expanding the end piece member 40 until the outer peripheral edge 48 of the end piece member 40 contacts the interior surface 38 of the hollow tube member 30; monitoring the radial distortion of the hollow tube member 30 as the end piece member 40 is further deformingly expanded; and ceasing the expansion of the end piece member 40, with the outer peripheral edge 48 of the end piece member 40 fixedly engaging the interior surface 38 of the hollow tube member 30, once the radial distortion of the tube member 30 reaches a predetermined distortion value. However, it should be understood that the use of flowable adhesive 60 enhances the distortion-free mounting method by eliminating dimensional discrepancies which exist in direct structure-to-structure contact.

In the preferred embodiment of the present invention, the end piece member 40 is comprised of a deformingly expandable collet 52 having an outer expanding surface 53 and an inner engaging surface 54, a central camming member 56 adapted to mesh with the inner engaging surface 54, and drive means 58 for engaging the central camming member 56 with the inner engaging surface 54. More specifically, the central camming member 56 of the expandable end piece member 40 embodied herein is conical in shape, and the drive means 58 is threadedly mated with the central camming member 56.

As the drive means 58 is rotated, the conically-shaped central camming member 56 is drawn into the expandable collet 52, so as to uniformly force the outer expanding surface 53 radially outward.

As previously mentioned, the air centering device 70 of the preferred embodiment includes a positioning means 76 for holding the end piece member 40 concentrically-aligned within the chamber 72 and activating the drive means 58 to deformingly expand the end piece member 40. As embodied herein, the positioning means 76 itself is concentrically aligned within the chamber 72, and capable of gripping and rotating the drive means 58 of the end piece member 40, so as to draw the central camming member 56 into engagement with the collet 52. Of course if an alternative end piece member 40 configuration were used, the positioning means 76 would be required to match the drive means 58, accordingly.

It is noted in the preferred embodiment that the positioning means 76 used for activating the drive means 58 cooperates with the means used for monitoring the radial distortion of the tube member 30, such that the drive means 58 is automatically deactivated when the monitoring means indicates a predetermined radial distortion value. In this manner, the central camming member 56 is maintained in stationary engagement with the inner engaging surface 54 of the collet 52 to hold the outer expanding surface 53 in a deformingly expanded condition fixedly engaging the interior surface 38 of the hollow tube member 30.

In the preferred embodiment, monitoring of the radial distortion of the hollow tube member 30 may be performed by pressure indicators 78 located within the chamber 72. As the hollow tube member 30 expands radially outward, the distance between the outer surface of the concentrically-aligned tube member 30 and the inner peripheral wall 73 of the chamber 72 decreases. As a result of the decreased volume within the chamber 72, the rebound air pressure buildup 77 within the chamber 72 increases. The rebound pressure buildup 77 value corresponding to the predetermined distortion value is then determinative of deactivation of the drive means 58. Alternatively, linear measurement devices or the like may be incorporated to monitor the radial distortion of the hollow tube member 30.

It will be apparent to those skilled in the art that various modifications and variations can be made in the distortion-free mounting method of the present invention without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of mounting an end piece member on an open end of a thin-walled hollow tube member without inducing radial distortion of the hollow tube member, wherein one of said members is freely insertable within the other of said members, and each of said members has a central axis, the method comprising the steps of:

supporting the end piece member with the central axis of the end piece member oriented vertically;

suspending the hollow tube member in a manner which enables controlled longitudinal movement of the hollow tube member while providing freedom of universal lateral and angular movement of the hollow tube member, the hollow tube member being suspended above the end piece member with the central axis of the hollow tube member oriented vertically, and with said open end remaining free of radial distortion and directed toward the end piece member;

centering the hollow tube member to concentrically align the hollow tube member with the end piece member;

inserting said one of said members into said other of said members, said one of said members having an outer peripheral edge spaced from and surrounded by an interior surface of said other of said members; and securing the outer peripheral edge of said one of said members to the interior surface of said other of said members while maintaining the concentric alignment of the hollow tube member with the end piece member.

2. The method of claim 1, wherein the securing step includes the steps of:

applying a layer of flowable adhesive between the outer peripheral edge of said one of said members and the interior surface of said other of said members; and curing the flowable adhesive to affix said one of said members concentrically within said other of said members.

3. The method of claim 2, wherein the step of applying a layer of flowable adhesive is performed prior to the step of centering the hollow tube member.

4. The method of claim 1, wherein the inserting step includes the step of inserting the end piece member into said open end of the hollow tube member.

5. The method of claim 4, wherein the end piece member is deformingly expandable; and the securing step includes the steps of:

deformingly expanding the end piece member until the outer peripheral edge of the end piece member contacts the interior surface of the hollow tube member;

monitoring the radial distortion of the hollow tube member as the end piece member is further deformingly expanded; and ceasing the expansion of the end piece member, with the outer peripheral edge of the end piece member fixedly engaging the interior surface of the hollow tube member, once the radial distortion of the hollow tube member reaches a predetermined distortion value.

6. The method of claim 5, wherein the end piece member is comprised of a deformingly expandable collet having an outer expanding surface and an inner engaging surface, a central camming member adapted to mesh said inner engaging surface, and drive means for engaging said central camming member with said inner engaging surface;

the deformingly expanding step includes the step of activating said drive means to engage said central camming member with said inner engaging surface to deformingly expand said outer expanding surface into contact with the interior surface of the hollow tube member;

and the ceasing step includes the step of deactivating said drive means to maintain said central camming member in stationary engagement with said inner engaging surface and hold said outer expanding surface in a deformingly expanded condition fixedly engaging the interior surface of the hollow tube member.

7. The method of claim 4, wherein the end piece member is deformingly expandable; and the securing step includes the steps of:

applying a layer of flowable adhesive between the outer peripheral edge of the end piece member and the interior surface of the hollow tube member;

deformingly expanding the end piece member until the layer of flowable adhesive is sufficiently compressed to absorb any dimensional discrepancies between the outer peripheral edge of the end piece member and the interior surface of the hollow tube member;

monitoring the radial distortion of the hollow tube member as the end piece member is further deformingly expanded;

ceasing the expansion of the end piece member once the radial distortion of the hollow tube member reaches a predetermined distortion value; and curing the flowable adhesive to affix the end piece member concentrically within the hollow tube member.

8. The method of claim 1, wherein the supporting step includes the step of:

preloading the end piece member into an air centering device; the air centering device comprising a chamber with a peripheral wall, means for concentrically supporting the end piece member within the chamber, and a plurality of inwardly-directed radial air jets uniformly spaced along said inner wall;

and further wherein the centering step includes the step of:

positioning the hollow tube member in the air centering device, the air jets of the air centering device creating a uniform pressure acting against the hollow tube member to concentrically align the hollow tube member with the chamber and the end piece member preloaded therein.

9. The method of claim 8, wherein the securing step includes the steps of:

applying a layer of flowable adhesive between the outer peripheral edge of said one of said members and the interior surface of said other of said members; and curing the flowable adhesive to affix said one of said members concentrically within said other of said members.

10. The method of claim 8, wherein the inserting step comprises the step of inserting the end piece member into said open end of the hollow tube member.

11. The method of claim 10, wherein the end piece member is deformingly expandable; and the securing step includes the steps of:

deformingly expanding the end piece member until the outer peripheral edge of the end piece member contacts the interior surface of the hollow tube member;

monitoring the radial distortion of the hollow tube member as the end piece member is further deformingly expanded; and ceasing the expansion of the end piece member, with the outer peripheral edge of the end piece member fixedly engaging the interior surface of the hollow tube member, once the radial distortion of the hollow tube member reaches a predetermined distortion value.

12. The method of claim 11, wherein the end piece member is comprised of a deformingly expandable collet having an outer expanding surface and an inner engaging surface, a central camming member adapted to mesh said inner engaging surface, and drive means for engaging said central camming member with said inner engaging surface;

the deformingly expanding step includes the step of activating said drive means to engage said central camming member with said inner engaging surface to deformingly expand said outer expanding surface into contact with the interior surface of the hollow tube member;

and the ceasing step includes the step of deactivating said drive means to maintain said central camming member in stationary engagement with said inner engaging surface and hold said outer expanding surface in a deformingly expanded condition fixedly engaging the interior surface of the hollow tube member.

13. The method of claim 11, wherein the end piece member is deformingly expandable; and the securing step includes the steps of:

applying a layer of flowable adhesive between the outer peripheral edge of the end piece member and the interior surface of the hollow tube member;

deformingly expanding the end piece member until the layer of flowable adhesive is sufficiently compressed to absorb any dimensional discrepancies between the outer peripheral edge of the end piece member and the interior surface of the hollow tube member;

monitoring the radial distortion of the hollow tube member as the end piece member is further deformingly expanded;

ceasing the expansion of the end piece member once the radial distortion of the hollow tube member reaches a predetermined distortion value; and curing the flowable adhesive to affix the end piece member concentrically within the hollow tube member.

14. The method of claim 13, wherein the step of applying a layer of flowable adhesive is performed prior to the step of centering the hollow tube member.

15. The method of claim 13, wherein step of applying a layer of flowable adhesive first comprises the step of selecting an endothermic flowable adhesive.

16. A method of mounting an end piece member on an open end of a thin-walled hollow tube member without inducing radial distortion of the hollow tube member, wherein one of said members is freely insertable within the other of said members, and each of said members has a central axis, the method comprising the steps of:

supporting the end piece member with the central axis of the end piece member oriented vertically;

centering the hollow tube member above the end piece member with the hollow tube member concentrically aligned with the end piece member and said open end directed toward the end piece member, the centering step being performed while the hollow tube member is suspended in a manner which enables controlled longitudinal movement of the hollow tube member and which provides freedom of universal lateral and angular movement of the hollow tube member;

inserting said one of said members into said other of said members, said one of said members having an outer peripheral edge spaced from and surrounded by an interior surface of said other of said members;

applying a layer of flowable adhesive between the outer peripheral edge of said one of said members and the interior surface of said other of said members; and curing the flowable adhesive to affix said one of said members concentrically within said other of said members.

17. The method of claim 16, wherein the supporting step includes the step of:

preloading the end piece member into an air centering device; the air centering device comprising a chamber with a peripheral wall, means for concentrically supporting the end piece member within the chamber, and a plurality of inwardly-directed radial air jets uniformly spaced along said inner wall;

and further wherein the centering step includes the step of:

positioning the hollow tube member in the air centering device, the air jets of the air centering device creating a uniform pressure acting against the hollow tube member to concentrically align the hollow tube member with the chamber and the end piece member preloaded therein.

18. The method of claim 17, wherein the inserting step comprises the step of inserting the end piece member into said open end of the hollow tube member.

19. The method of claim 18, wherein the end piece member is deformingly expandable; and the method of mounting further includes, prior to the curing step, the steps of:

deformingly expanding the end piece member until the layer of flowable adhesive is sufficiently compressed to absorb any dimensional discrepancies between the outer peripheral edge of the end piece member and the interior surface of the hollow tube member;

monitoring the radial distortion of the hollow tube member as the end piece member is further deformingly expanded; and ceasing the expansion of the end piece member once the radial distortion of the hollow tube member reaches a predetermined distortion value.

20. The method of claim 16, wherein the step of applying a layer of flowable adhesive is performed prior to the step of centering the hollow tube member.

* * * * *

UNITED STATES PATENT AND TRADEMARK OFFICE
CERTIFICATE OF CORRECTION

PATENT NO. : 5,177,854

DATED : January 12, 1993

INVENTOR(S) : William G. Herbert, Jr., et al.

It is certified that error appears in the above-identified patent and that said Letters Patent is hereby corrected as shown below:

On the title page, after item [75] insert the following:

[73] --Assignee:

Xerox Corporation
    a corporation of New York, Stamford,
    County of Fairfield, Connecticut--.

Signed and Sealed this

Twelfth Day of September, 1995

Attest:

BRUCE LEHMAN

*Attesting Officer*     *Commissioner of Patents and Trademarks*